US010149455B2

(12) United States Patent
Tharp

(10) Patent No.: US 10,149,455 B2
(45) Date of Patent: *Dec. 11, 2018

(54) ANIMAL FEEDER WITH INSERTABLE FEED RESTRICTOR

(71) Applicant: Walter Tharp, Indian Valley, ID (US)

(72) Inventor: Walter Tharp, Indian Valley, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 15/874,025

(22) Filed: Jan. 18, 2018

(65) Prior Publication Data

US 2018/0139927 A1 May 24, 2018

Related U.S. Application Data

(63) Continuation of application No. 15/258,229, filed on Sep. 7, 2016, now Pat. No. 9,872,479, which is a
(Continued)

(51) Int. Cl.
*A01K 5/01* (2006.01)
*A01K 7/00* (2006.01)

(52) U.S. Cl.
CPC .............. *A01K 5/01* (2013.01); *A01K 5/0114* (2013.01); *A01K 7/00* (2013.01)

(58) Field of Classification Search
CPC ........ A01K 5/01; A01K 5/0114; A01K 15/02; A01K 15/028; A01K 29/00; A01K 5/0135; A01K 7/00
(Continued)

(56) References Cited

U.S. PATENT DOCUMENTS

| 387,821 | A | 8/1888 | Smith | |
| D46,288 | S | * 8/1914 | Moe | ............................. D30/130 |

(Continued)

*Primary Examiner* — Yvonne R Abbott-Lewis
(74) *Attorney, Agent, or Firm* — Inventive Law Inc.; Jim H. Salter

(57) ABSTRACT

An improved animal feeder with an insertable feed restrictor. An example embodiment includes: a barrel into which animal feed may be deposited, the barrel including a first locking mechanism, the barrel being generally cylindrical; and a feed restrictor configured for removable insertion into the opening of the barrel, the feed restrictor being generally cylindrical with an open upper end and a round side surface, the feed restrictor including a second locking mechanism, the diameter of the feed restrictor being slightly less than the diameter of the barrel, the round side surface being configured to slide adjacent to an inner round surface of the barrel, the feed restrictor being configured to prevent feed extraction between the inner round surface of the barrel and the round side surface of the feed restrictor, the height of the feed restrictor being sufficient to prevent inversion of the feed restrictor while inserted in the barrel, the feed restrictor including a plurality of feed access holes arranged on a lower surface of the feed restrictor, the feed restrictor being configured to float on top of the animal feed deposited in the barrel, the feed restrictor being further configured to freely spin laterally and freely slide longitudinally in the barrel, the feed restrictor being further configured to lock into the barrel when the second locking mechanism is not properly configured relative to the first locking mechanism.

20 Claims, 22 Drawing Sheets

Related U.S. Application Data continuation-in-part of application No. 13/334,801, filed on Dec. 22, 2011, now Pat. No. 9,439,394, which is a continuation-in-part of application No. 12/455,703, filed on Jun. 5, 2009, now Pat. No. 8,082,882.

(58) Field of Classification Search
USPC .......... 119/61.54, 61.1, 61.2, 61.3, 61.5; 220/578, 529; D30/130; 426/115, 119
See application file for complete search history.

(56) References Cited

U.S. PATENT DOCUMENTS

| | | | |
|---|---|---|---|
| 1,287,773 A | 12/1918 | Schumacher | |
| 3,040,897 A * | 6/1962 | Holman | B65D 1/10 210/237 |
| 3,589,340 A * | 6/1971 | Beliles | A01K 5/01 119/61.54 |
| 4,020,794 A | 5/1977 | Nethery | |
| D296,020 S * | 5/1988 | McCarroll | D30/130 |
| 5,377,621 A * | 1/1995 | Camm | A01K 5/0114 119/61.54 |
| 5,706,721 A * | 1/1998 | Homes | A47J 36/08 100/110 |
| 5,887,544 A * | 3/1999 | Popelier | A01K 5/01 119/61.54 |
| 5,971,202 A * | 10/1999 | Filbrun | A47G 19/2211 220/719 |
| 6,153,237 A * | 11/2000 | Ferguson | B65D 25/02 206/499 |
| 6,431,117 B1 * | 8/2002 | Rauch | A01K 5/01 119/58 |
| 6,951,189 B1 | 10/2005 | Lienemann | |
| 7,753,000 B1 * | 7/2010 | Turner | A01K 5/01 119/57 |
| 8,082,882 B1 | 12/2011 | Tharp | |
| 8,342,128 B2 * | 1/2013 | Rocker | A01K 5/0128 119/61.2 |
| 8,348,083 B2 * | 1/2013 | Light | A47G 19/02 220/529 |
| 8,381,684 B2 * | 2/2013 | Crawford | A01K 5/0114 119/61.1 |
| 8,651,055 B2 * | 2/2014 | Dreger | A01K 5/0135 119/61.5 |
| 8,887,665 B2 * | 11/2014 | Rocker | A01K 5/0128 119/61.2 |
| 9,345,230 B1 * | 5/2016 | Seavey Audette | A01K 5/01 |
| 9,352,901 B2 * | 5/2016 | Furrow | A47G 19/2222 |
| D762,017 S * | 7/2016 | Tsengas | D30/121 |
| 9,439,394 B2 | 9/2016 | Tharp | |
| 9,457,939 B1 * | 10/2016 | Peters | B65D 41/023 |
| 9,872,479 B2 | 1/2018 | Tharp | |
| 2016/0029595 A1* | 2/2016 | Jarvis | A01K 15/02 119/719 |

* cited by examiner

ANIMAL FEEDER WITH INSERTABLE FEED RESTRICTOR

PRIORITY APPLICATIONS

This is a continuation patent application of U.S. patent application, Ser. No. 15/258,229; filed Sep. 7, 2016; which is a continuation-in-part patent application of U.S. patent application, Ser. No. 13/334,801; filed Dec. 22, 2011; now U.S. Pat. No. 9,439,394, which is a continuation-in-part of patent application, Ser. No. 12/455,703; filed Jun. 5, 2009; now U.S. Pat. No. 8,082,882. This present patent application draws priority from the referenced patent applications. The entire disclosure of the referenced patent applications is considered part of the disclosure of the present application and is hereby incorporated by reference herein in its entirety.

TECHNICAL FIELD

The disclosed subject matter relates to the field of animal feeders.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008-2016 Walter Tharp, All Rights Reserved.

BACKGROUND

Grazing in a field is a natural method for feeding domestic animals, such as livestock, farm animals, and domestic pets. Throughout history, when grazing in a field was not easily available, animals have been fed in stalls or corrals with hay or other feed placed in a feed box and the animal is allowed to feed at its leisure. Such hay boxes are nothing more than a containment box with an open top, the opening allowing the animal to reach into the box from the top to get at the feed.

Several problems exist with this type of a hay box. First, a significant amount of hay inevitably spills onto the floor of the stall or ground. This loose hay results in a wasting of the hay as feed material, often results in the ingestion of contaminates by the animal as it eats hay from the floor of the stall, and creates additional work in cleaning the stall. An additional problem with prior hay boxes is that prior hay boxes also do not efficiently restrict the rate at which the animal can consume the feed. If feed is not continuously provided, the animal will often eat at an excessive rate when the feed is initially provided, resulting in potential digestion problems.

Improved devices for feeding animals include various forms of moving elements as described in some of the U.S. patents listed below. However, these conventional feeder designs do not efficiently restrict the rate at which the animal can consume the feed.

U.S. Pat. No. 5,887,544 describes a feed saving insert that is positionable on the surface of feed within a feed bucket. The insert includes a sheet formed into a disk that is sized to be loosely received through the bucket top opening and to rest against feed within the bucket. Access apertures are formed through the disk and are uniformly spaced about the disk to permit limited access to feed under the disk. The disk and access apertures are sized such that access to the feed within the bucket is limited and so the disk will float on the feed within the bucket and will change in elevation within the bucket in response to removal of feed during feeding. A guide shaft is provided, projecting downwardly from the disk and through an opening in the bucket bottom to hold the disk substantially parallel to the bucket bottom and guide the disk in its downward movement responsive to removal of feed from the bucket.

U.S. Pat. No. 6,431,117 describes an animal feeder providing feed to animals and includes a plurality of side and end walls defining an interior chamber. A perforated plate defines a bottom wall of the chamber and is moveable therein. A grate defines a top wall of the chamber and allows access to feed material contained in the chamber. A spring mechanism biases the plate toward the grate such that feed material located within the chamber is continuously provided to an animal feeding at the level of the grate.

U.S. Pat. No. 4,020,794 describes an animal feeding station which provides livestock, at virtually any desired location, waste-free access to fibrous feed material in quantities heretofore unobtainable with a portable unit. Compacted fibrous feed is charged into a rectangular-shaped, variable volume hopper formed by a pair of upstanding stationary, spaced-apart, opposing end walls and a pair of movably suspended mesh-covered side panels. The side panels are movably suspended on sloping tracks mounted interior the end walls such that the panels are positioned by gravity against the confined feed mass. Feeding livestock are able to grasp the fibrous feed through the mesh according to their need, and in doing so forcibly urge the panel, along the sloping tracks, against the remaining feed mass. Thus, the livestock have continuous limited access to the outer wall of the feed mass, until the mass is depleted; but are unable to obtain unrestricted access to the feed.

U.S. Pat. No. 6,951,189 describes a hay saver insert adapted to be removably positioned on and within a conventional cylindrical hay feeder. The insert includes an upper end portion which rests upon the upper end of the conventional feeder and a conical-shaped portion which extends downwardly into the interior of the feeder. Hay is placed within the insert and the animals have access thereto. Hay being pulled from the insert by the animals may fall into the area between the conical-shaped portion of the insert and the interior of the feeder which prevents the hay from being trampled.

Thus, an improved animal feeder with an insertable feed restrictor is needed.

BRIEF DESCRIPTION OF THE DRAWINGS

Embodiments are illustrated by way of example and not limitation in the figures of the accompanying drawings, in which.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is described an improved animal feeder with an insertable feed restrictor. A particular example embodiment includes a cylindrical barrel (or other form of feed container means) into which feed of various types can be deposited. An insertable feed restrictor (or other form of feed restricting means) is then inserted into the barrel on top of the feed deposited therein. The feed restrictor includes feed access holes, which allow an animal to get access to the feed in a restricted manner. The feed restrictor floats down into the barrel and can spin laterally as the feed is consumed.

Figure 1:
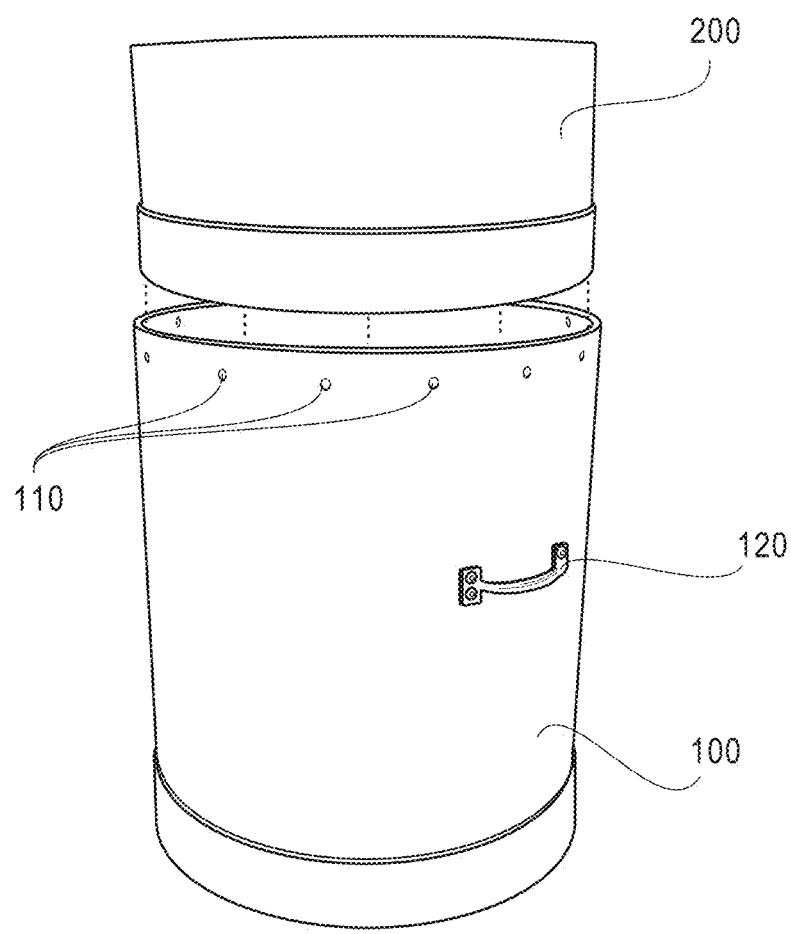
FIG. 1 illustrates a perspective side view of an example embodiment of the improved animal feeder showing the barrel and the insertable feed restrictor.

FIG. 1 illustrates a perspective side view of an example embodiment of the improved animal feeder. As shown, the example embodiment includes a barrel 100 and an insertable feed restrictor 200. In the particular embodiment shown, the barrel 100 is a cylindrical shape with an open upper end to receive feed and the insertable feed restrictor 200. The lower end of barrel 100 is closed or capped. In the particular embodiment, the barrel 100 and the feed restrictor 200 can be fabricated from polyethylene or a similar plastic blend material. Alternatively, another type of plastic or polyvinyl chloride (PVC) material can be used; however, PVC can become brittle at low temperatures and thus unsuitable in some environments. Alternative embodiments can be fabricated from other rigid materials, such as stainless steel, fiberglass, ceramic, concrete, stone, or wood. Alternative embodiments of the barrel 100 and the feed restrictor 200 can also be fabricated in different shapes, such as oval, triangular, rectangular, or polygonal. However, the preferred shape is cylindrical/circular. In the particular embodiment, the barrel 100 is approximately 24 inches tall and 20.5 inches in diameter. The diameter of the feed restrictor 200 is slightly less than the diameter of the barrel 100, so the feed restrictor 200 can be inserted into the open end of barrel 100 as shown in FIG. 1. In the particular embodiment, the feed restrictor 200 is approximately 9 inches tall and 18.5 inches in diameter. The wall thickness of the barrel 100 and the feed restrictor 200 in a particular embodiment is 0.25 inches. The dimensions of the barrel 100 and the feed restrictor 200 for particular embodiments can vary according to the animal size, the type of feed being used, and/or the volume of feed being used. The height and width of the barrel 100 and the feed restrictor 200 can change in proportion to each other so the difference in diameter or width dimension between the barrel 100 and the feed restrictor 200 provides a loose enough slip fit for the feed restrictor 200 to be inserted into, freely travel up and down, and spin freely within the interior of barrel 100. The dimensions of the feed restrictor 200 relative to the dimensions of the barrel 100 can be configured to prevent the feed restrictor 200 from being turned over (inverted) while positioned within the interior of barrel 100. As shown in FIG. 1, the barrel 100 also includes handles 120 to assist a user in moving the animal feeder.

Figure 2:
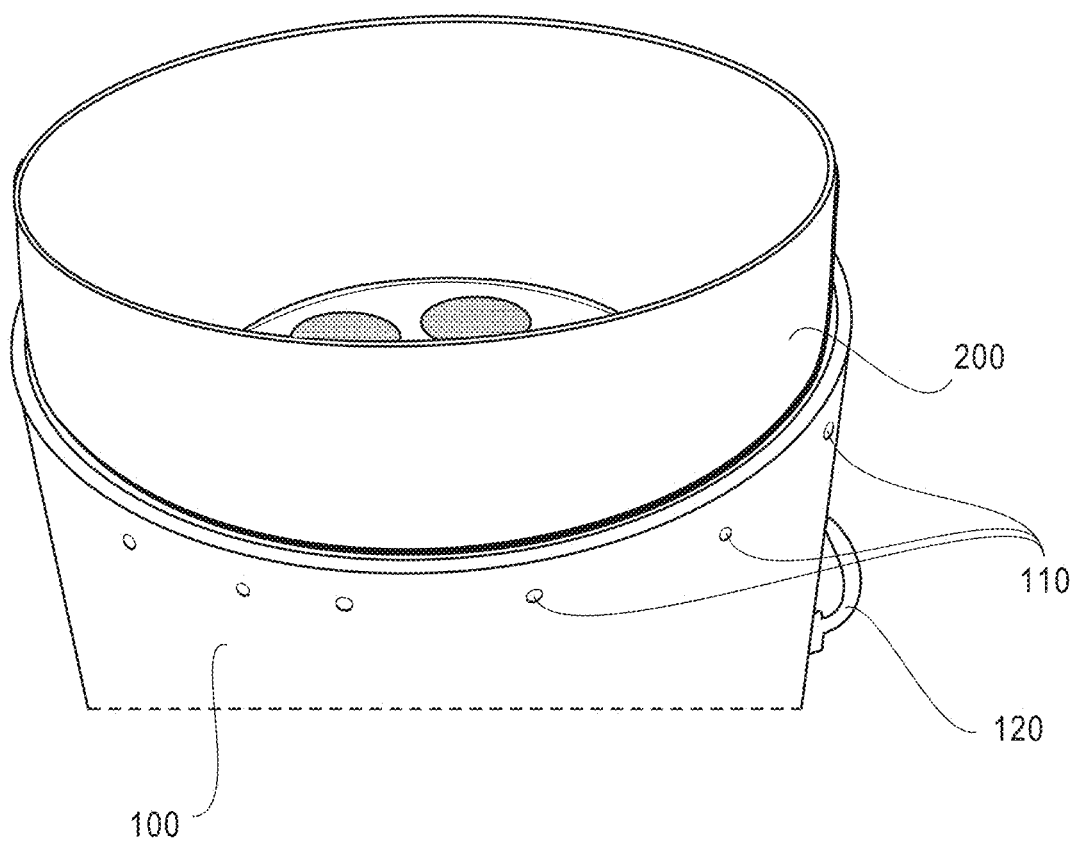
FIG. 2 illustrates a perspective top view of an example embodiment of the improved animal feeder showing the barrel and the insertable feed restrictor partially inserted into the top of the barrel.

FIG. 2 illustrates a perspective top view of an example embodiment of the improved animal feeder showing the barrel 100 and the insertable feed restrictor 200 partially inserted into the top of the barrel 100.

Figure 3:
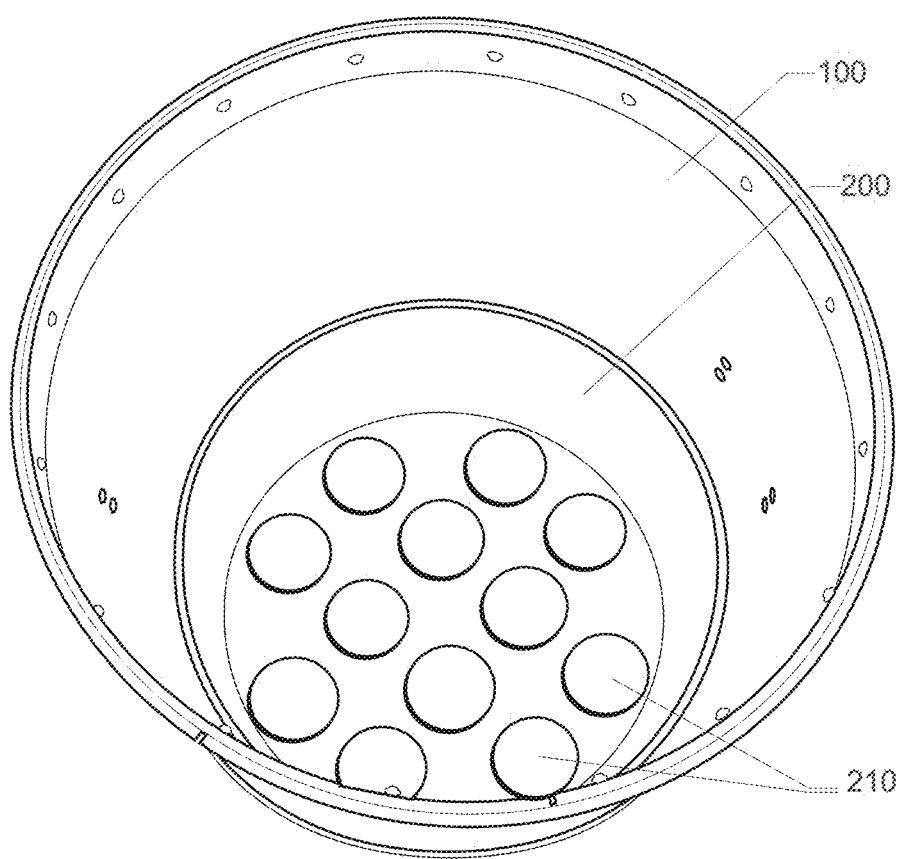
FIG. 3 illustrates a perspective view inside of an example embodiment of the improved animal feeder showing the interior of the barrel and the insertable feed restrictor fully inserted into the barrel.

FIG. 3 illustrates a perspective view inside of an example embodiment of the improved animal feeder showing the interior of the barrel 100 and the insertable feed restrictor 200 fully inserted into the barrel 100. It will be apparent to those of ordinary skill in the art that prior to inserting the feed restrictor 200 into the barrel 100, animal feed of various types can be deposited into the open top of barrel 100. Then, the feed restrictor 200 can be inserted into the open top of barrel 100, as shown in FIGS. 1-4, and allowed to rest on top of the animal feed deposited in barrel 100.

Figure 4:
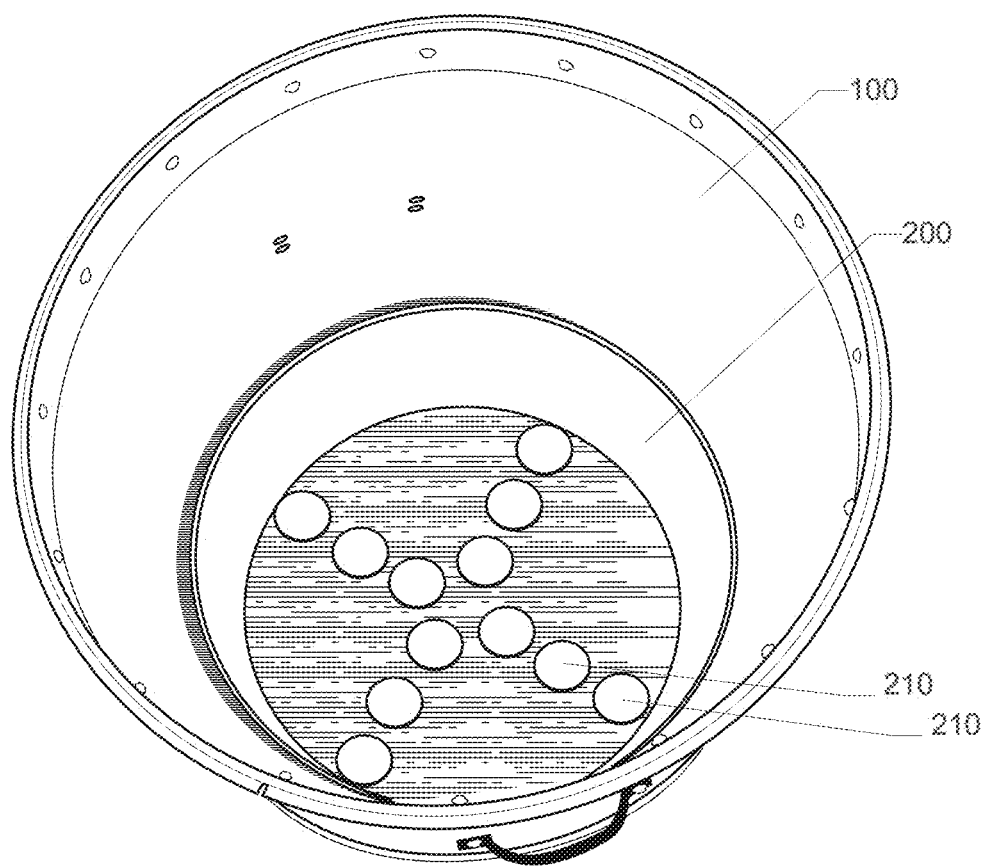
FIG. 4 illustrates a perspective view inside of another example embodiment of the improved animal feeder showing the interior of the barrel with another type of feed restrictor fully inserted into the barrel.

FIG. 4 illustrates a perspective view inside of another example embodiment of the improved animal feeder showing the interior of the barrel 100 with another type of feed restrictor 200 fully inserted into the barrel. As described in more detail below, the feed restrictor 200 includes feed access holes 210 that allow an animal to access the animal feed deposited in barrel 100 in a restricted manner. The arrangement of feed access holes 210 in feed restrictor 200 is specific to the type of animal being fed and specific to the type of animal feed being consumed. FIG. 3 shows a feed restrictor 200 with a first arrangement of feed access holes 210 generally useful for feeding hay to cattle in a restricted manner. FIG. 4 shows a feed restrictor 200 with a second arrangement of feed access holes 210 generally useful for feeding food pellets to cattle in a restricted manner. The various embodiments of the feed restrictor 200 are described in more detail below.

Figure 5:
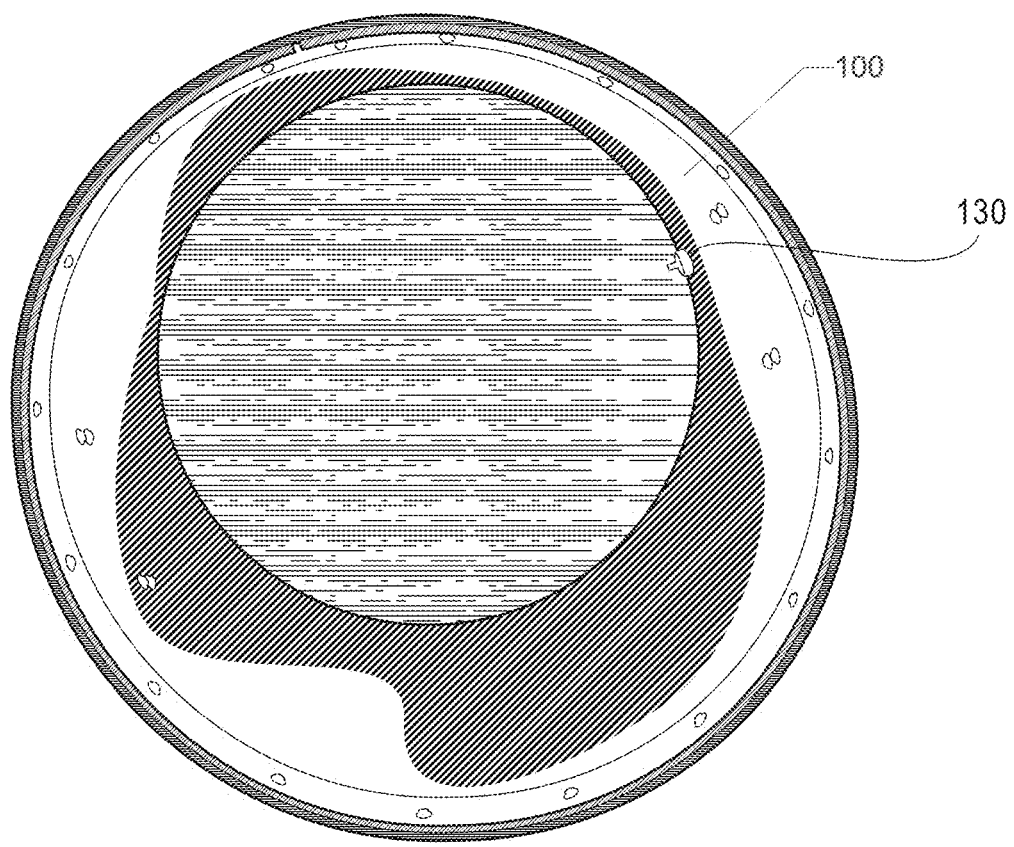
FIG. 5 illustrates a view inside of an example embodiment of the improved animal feeder showing the interior of the barrel without the feed restrictor.

FIG. 5 illustrates a view inside of an example embodiment of the improved animal feeder showing the interior of the barrel 100 without the feed restrictor 200. In a particular embodiment, the barrel 100 is closed or capped at the lower end. In an alternative embodiment, the barrel 100 can be molded as a single unit, which is closed at one end. Except for the open top, the barrel 100 provides a water-tight enclosure for the animal feed deposited therein. Near the lower end of barrel 100, a pluggable drain hole 130 is provided in the side wall of the barrel 100 to enable removal of any accumulated liquid at the bottom of barrel 100.

Figure 6:
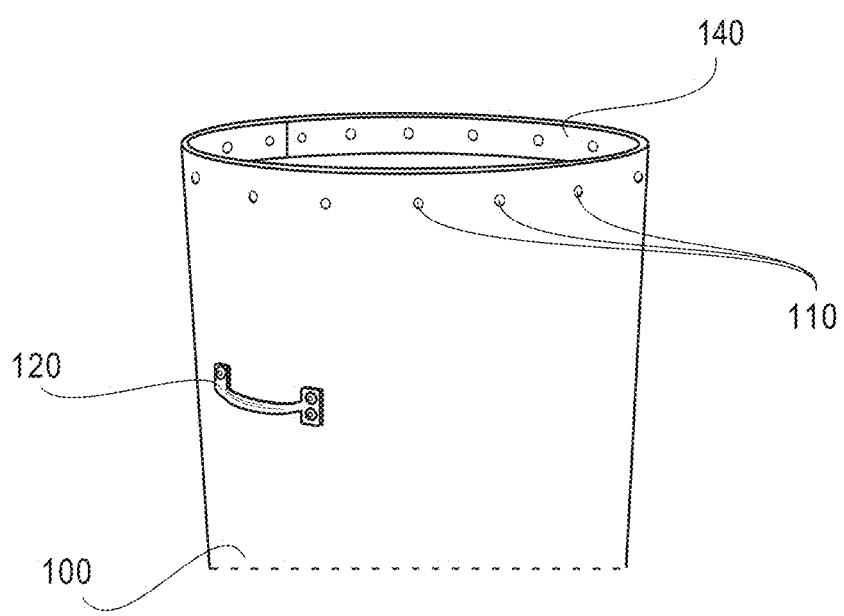
FIG. 6 illustrates a perspective side view of an example embodiment of the improved animal feeder showing the barrel without the feed restrictor.
Figure 7:
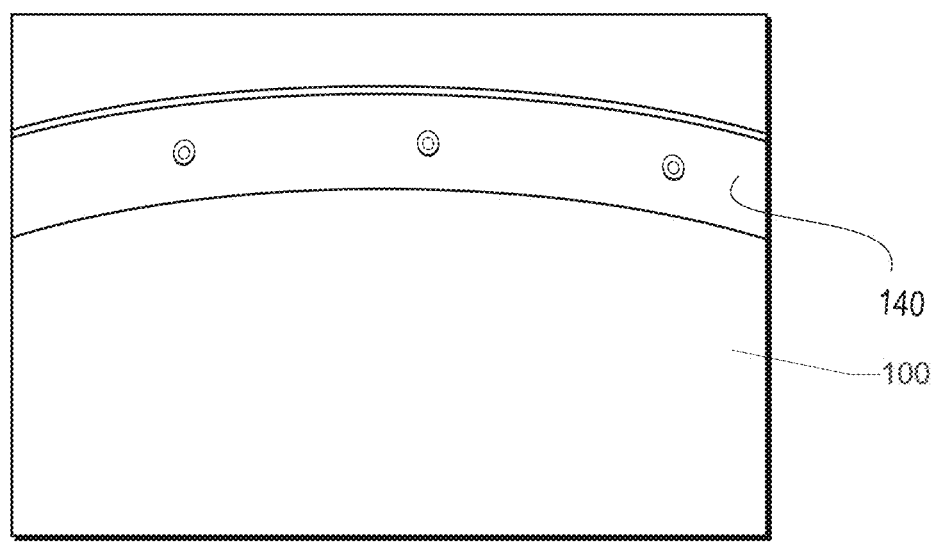
FIG. 7 illustrates a detail view of an example embodiment of the upper edge of the opening of the barrel showing the ridge or stop attached to the interior upper edge of the barrel.

FIG. 6 illustrates a perspective side view of an example embodiment of the improved animal feeder showing the barrel 100 without the feed restrictor 200. In the particular embodiment, the barrel 100 is shown to include a ridge or stop 140 on the inside of the barrel 100 at the edge of the upper open end of barrel 100. The stop 140 can be held in place with a plurality of fasteners 110, such as screws, bolts, or rivets. The stop 140 serves to prevent the feed restrictor 200 from being removed from the interior of barrel 100, unless the feed restrictor 200 is removed in a level and centered configuration. The stop 140 prevents the feed restrictor 200 from being undesirably removed from the interior of barrel 100 by animals feeding in the animal feeder. FIG. 7 illustrates a detail view of an example embodiment of the upper edge of the opening of the barrel 100 showing the ridge or stop 140 attached to the interior upper edge of the barrel 100. In an alternative embodiment, all the attached features of barrel 100, such as handles 120 and stop 140, can be incorporated into a one piece molded plastic unit representing the barrel 100 as described herein.

Figure 8:
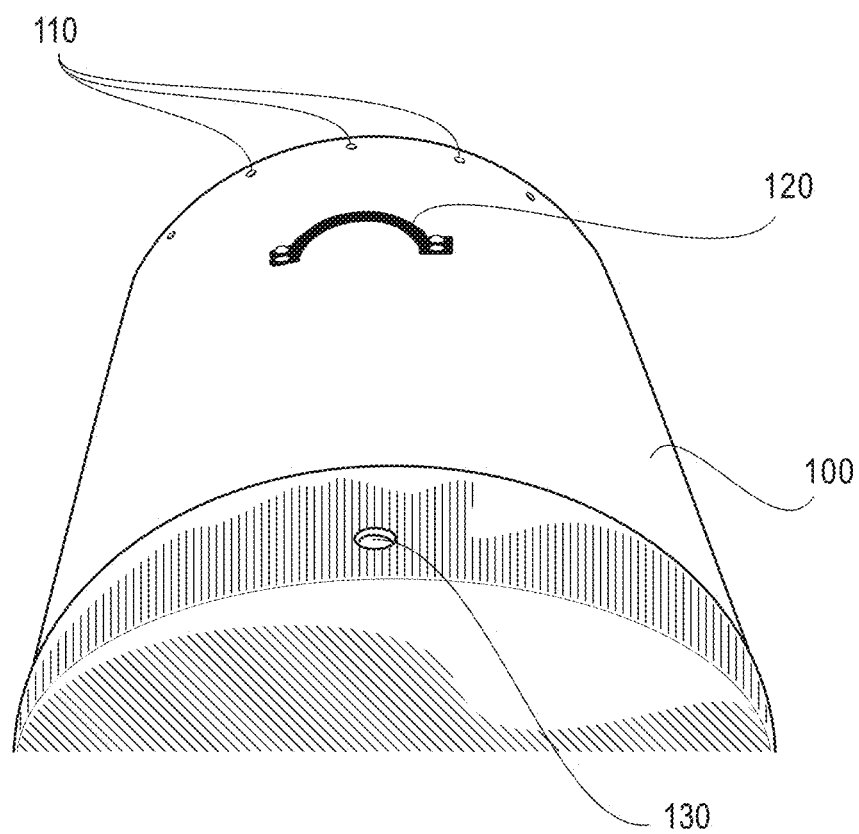
FIG. 8 illustrates a perspective view of the bottom and side of a barrel of an example embodiment of the improved animal feeder showing the barrel with handle and drain hole.
Figure 9:
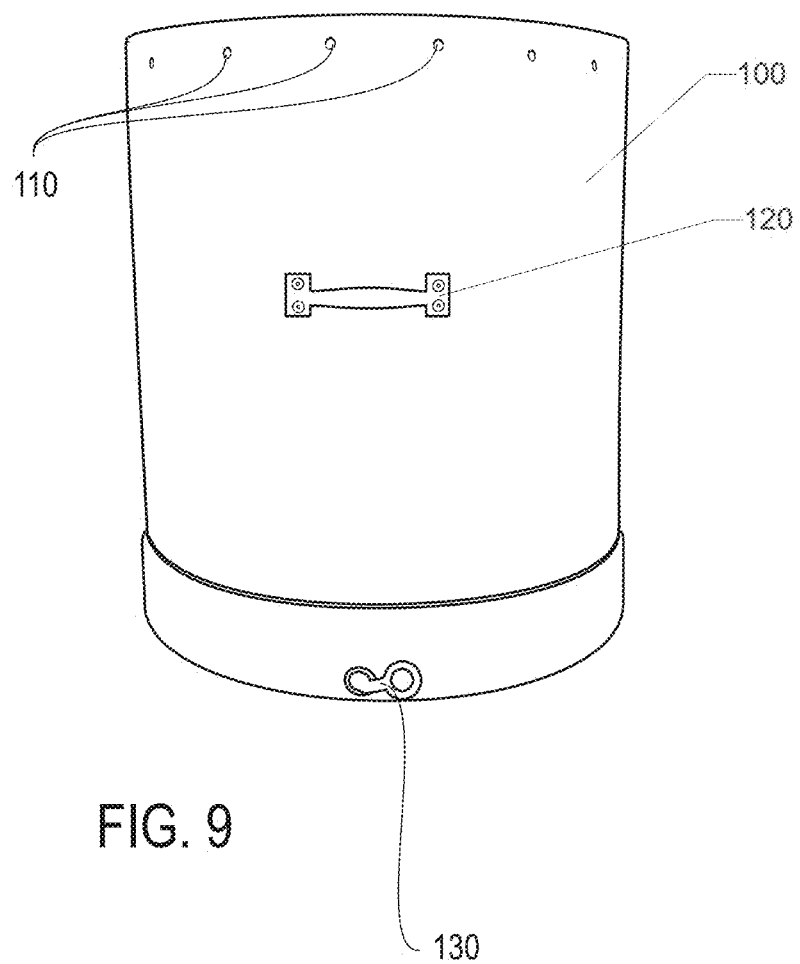
FIG. 9 illustrates a side view of an example embodiment of the improved animal feeder showing the barrel with handle and drain hole stopper.

FIG. 8 illustrates a perspective view of the bottom and side of a barrel 100 of an example embodiment of the improved animal feeder showing the barrel 100 with a handle 120 and drain hole 130. FIG. 9 illustrates a side view of an example embodiment of the improved animal feeder showing the barrel 100 with the handle 120 and the drain hole 130 plugged with a stopper. In a particular embodiment, the barrel 100 can also be provided with rings or hooks that can be used to strap the barrel 100 in an upright position.

Figure 10:
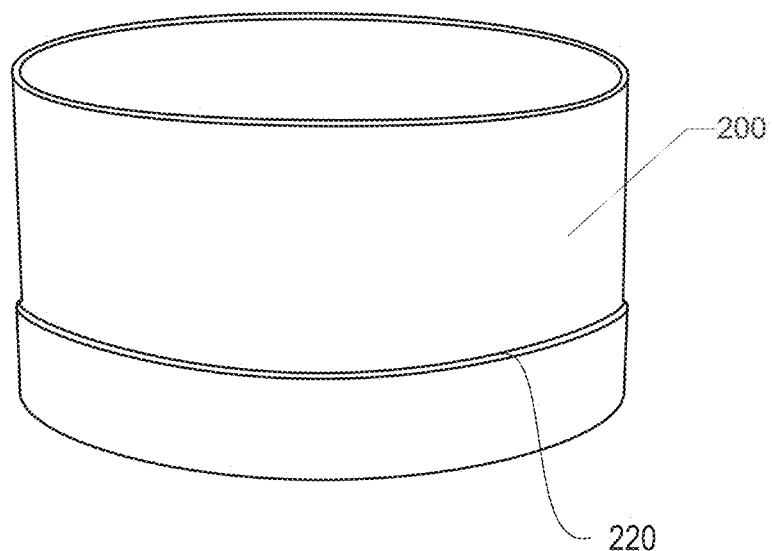
FIG. 10 illustrates a perspective side view of an example embodiment showing the feed restrictor.

FIG. 10 illustrates a perspective side view of an example embodiment showing the feed restrictor 200. As described above, various alternative embodiments of the feed restrictor 200 can be fabricated from various materials in various different shapes and dimensions. In a particular embodiment, the lower end or bottom of feed restrictor 200 can be closed or capped with cap 220. In an alternative embodiment, the feed restrictor 200 can be molded as a single unit, which is closed at one end. The cap 220 at the lower end or bottom of feed restrictor 200 can be configured with an arrangement of feed access holes 210, as shown in FIGS. 11-14.

Figure 11:
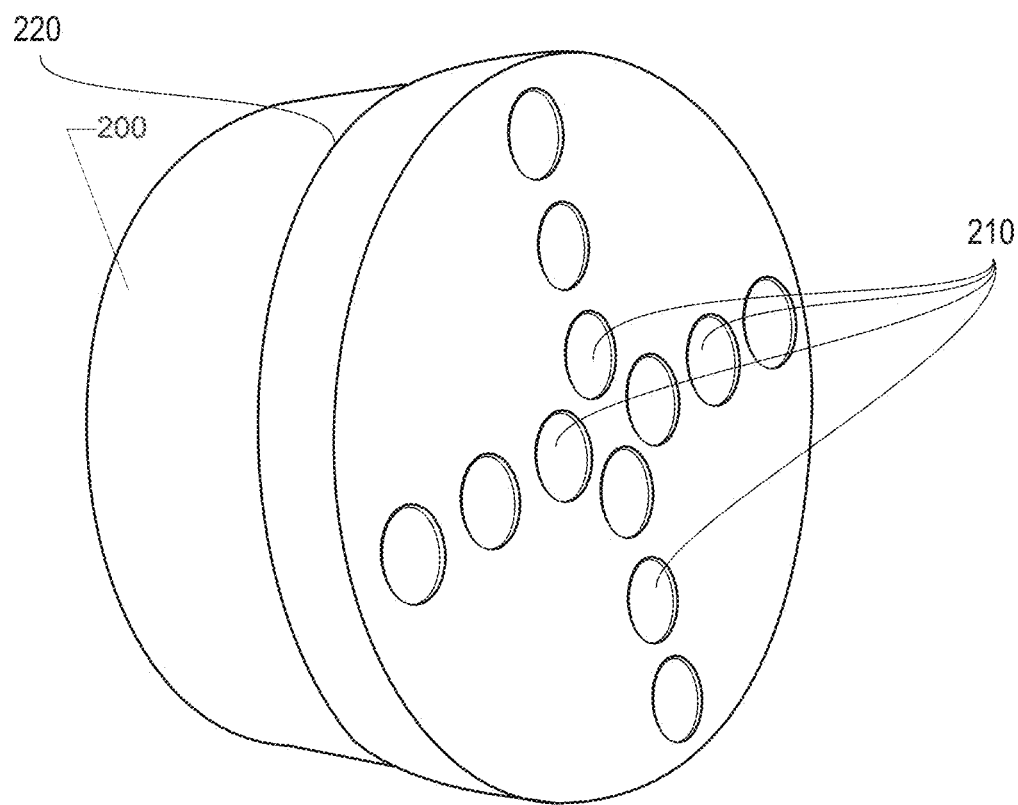
FIG. 11 illustrates a perspective bottom view of an example embodiment showing the feed restrictor with an example arrangement of feed access holes.

FIG. 11 illustrates a perspective bottom view of an example embodiment showing the feed restrictor 200 with an example arrangement of feed access holes 210 that allow an animal to access the animal feed deposited in barrel 100 in a restricted manner. The arrangement of feed access holes 210 in feed restrictor 200 is specific to the type of animal being fed and specific to the type of animal feed being consumed.

Figure 12:
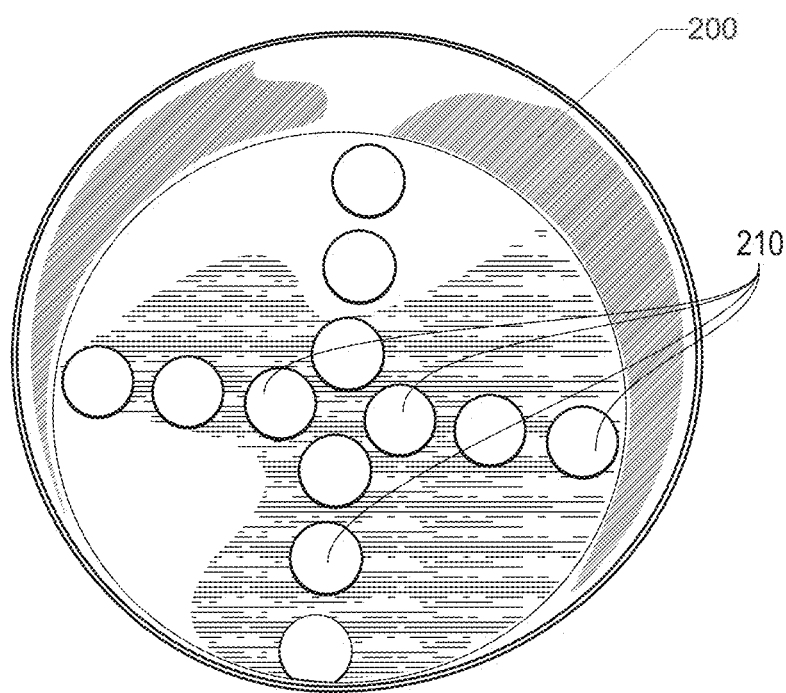
FIG. 12 illustrates a perspective interior view of an example embodiment showing the feed restrictor with an example arrangement of feed access holes.

FIG. 12 illustrates a perspective interior view of an example embodiment showing the feed restrictor 200 with an example arrangement of feed access holes 210. When the feed restrictor 200 is inserted into the barrel 100 bottom side down and on top of the animal feed deposited into the barrel 100, the feeding animals will have access to the interior of feed restrictor 200. Feeding animals will also have access to the animal feed in barrel 100 through the feed access holes 210. The feed access holes 210 serve to restrict the amount of feed the animals can consume in a given period of time. If the cap 220 is configured with a greater number of feed access holes 210, the animals will be able to consume a greater quantity of feed in a lesser quantity of time. Similarly, if the cap 220 is configured with feed access holes 210 each having a larger size, the animals will be able to consume a greater quantity of feed in a lesser quantity of time. Conversely, if the cap 220 is configured with a lesser number of feed access holes 210 and/or each feed access hole 210 having a smaller size, the animals will be able to consume a lesser quantity of feed in a greater quantity of time. Additionally, the number and size of feed access holes 210 can be configured for the specific type of animal being fed and the specific type of animal feed being consumed. For example, larger animals, such as cattle or horses, feeding on hay, alfalfa, or long stem grasses may need an arrangement of feed access holes 210 that are greater in number and larger in size. Conversely, smaller animals, such as goats, sheep, or dogs, feeding on food pellets or granular feed mixes may need an arrangement of feed access holes 210 that are lesser in number and smaller in size. In a particular embodiment, larger feed access holes 210 are 3.25 inches in diameter. In a particular embodiment, smaller feed access holes 210 are 2.25 inches in diameter. In general, the hole size diameter of the feed access holes 210 is determined according to the type of feed being used. An arrangement of twelve feed access holes 210 is shown in the example embodiments of FIGS. 11-14. It will be apparent to those of ordinary skill in the art that a lesser or greater number of feed access holes 210 can be used in particular alternative embodiments.

Beneficially, the feed restrictor 200 of various embodiments can float on the feed within the barrel 100 and can change in elevation within the barrel 100 in response to removal of feed during feeding. Additionally, the feed restrictor 200 can spin laterally within the barrel 100 to expose all areas of the feed underneath feed access holes 210. The spinning action of the feed restrictor 200 within the barrel 100 also serves to catch the ends of the hay, alfalfa, or long stem grasses underneath feed access holes 210. As the ends of the feed are caught by the spinning feed access holes 210, the ends of the feed tend to protrude through the feed access holes 210 and thereby become more accessible to a feeding animal. In this manner, unlike conventional feeders that use shafts or guides, the various embodiments described herein are more efficient in providing restricted access to all of the feed deposited in the barrel 100 by virtue of the innovative design of the feed restrictor 200 and barrel 100.

Figure 13:
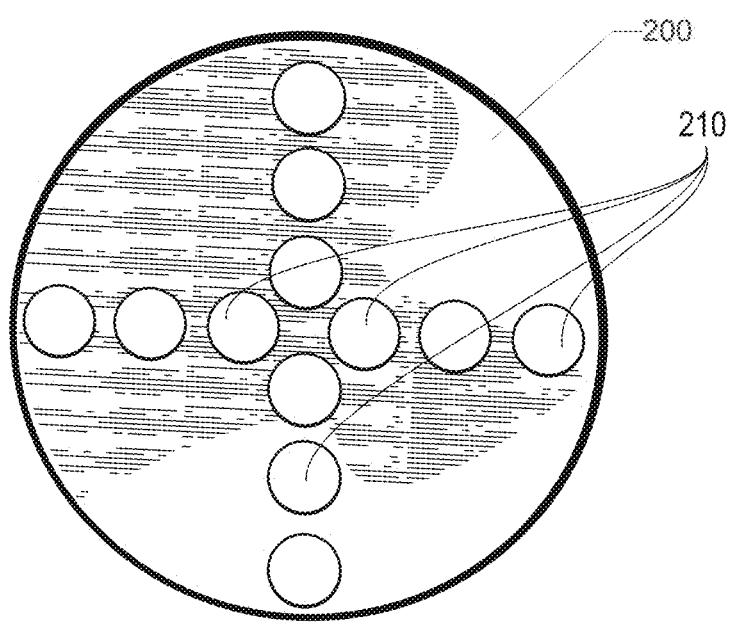
FIG. 13 illustrates a bottom view of an example embodiment showing the feed restrictor with an example arrangement of feed access holes.
Figure 14:
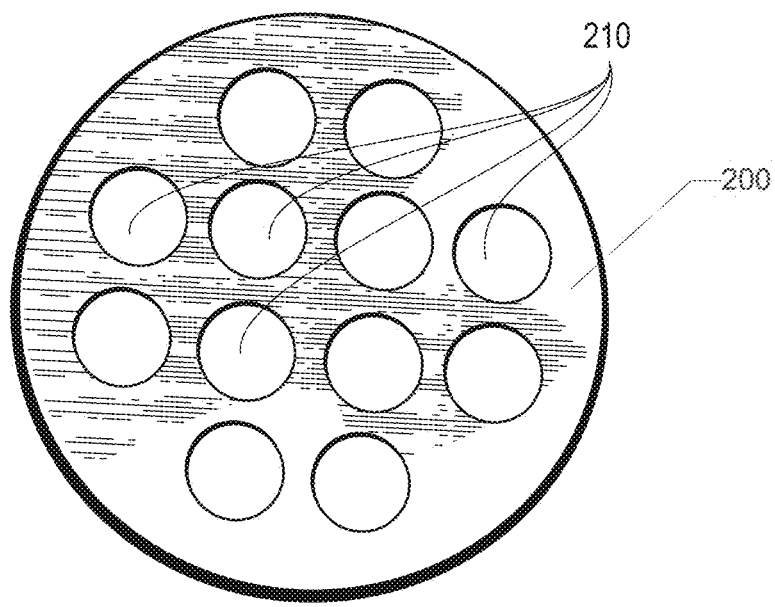
FIG. 14 illustrates a bottom view of an example embodiment showing the feed restrictor with an alternative example arrangement of feed access holes.

FIG. 13 illustrates a bottom view of an example embodiment showing the feed restrictor 200 with an example arrangement of feed access holes 210. FIG. 14 illustrates a bottom view of an example embodiment showing the feed restrictor 200 with an alternative example arrangement of feed access holes 210. As described above, the particular arrangement of feed access holes 210 can be configured for a particular type of animal or feed. Additionally, the feed access holes 210 can be positioned in cap 220 in an orthogonal, spiral, or random placement to facilitate access to a particular type of feed for a particular type of animal.

Figure 15:
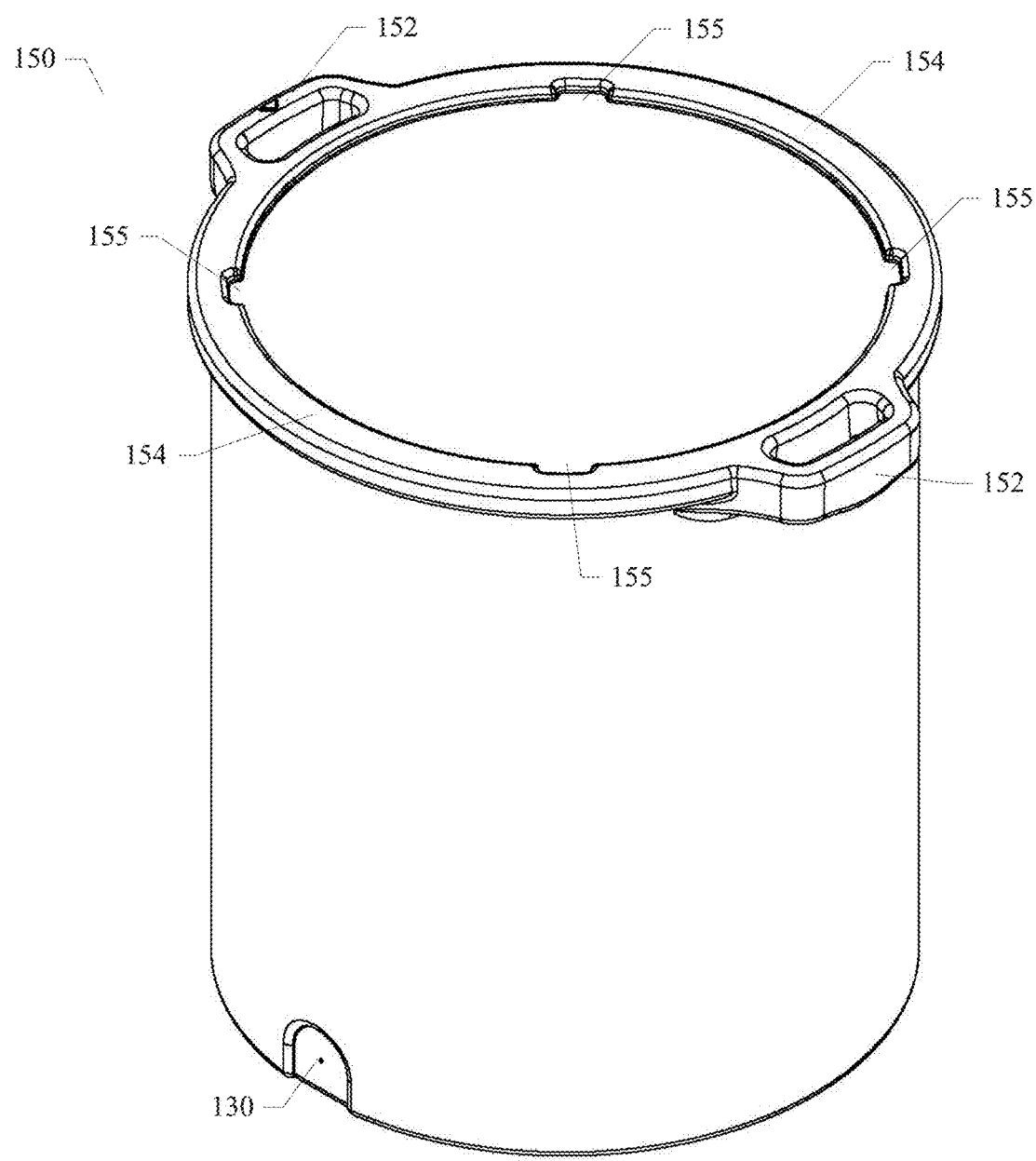
FIG. 15 illustrates an isometric view of an alternative example embodiment of the improved animal feeder showing the barrel without the feed restrictor.
Figure 18:
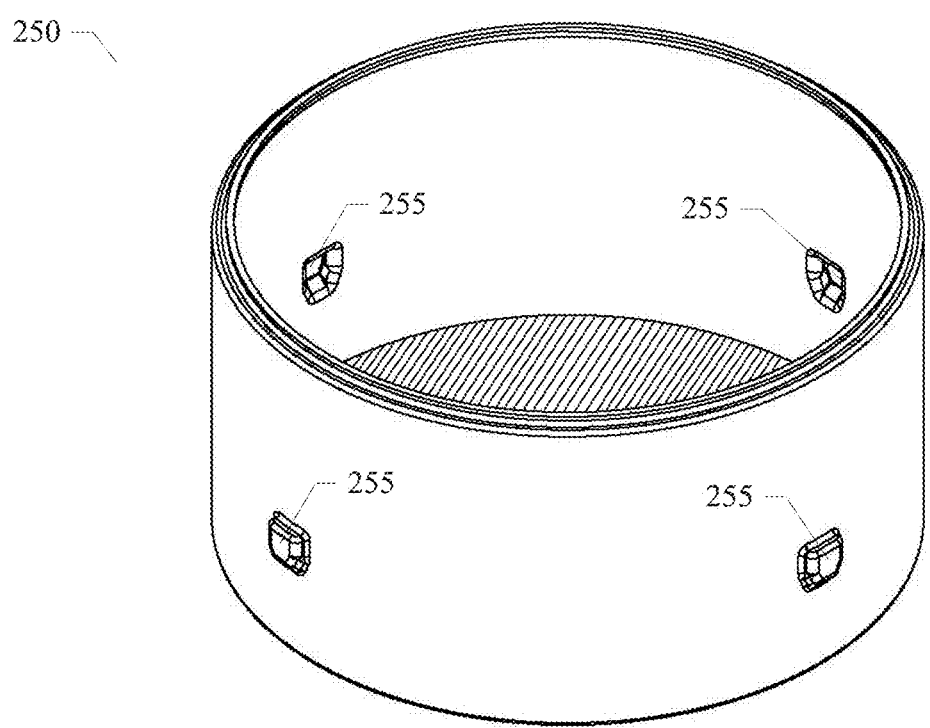
FIG. 18 illustrates an isometric view of an alternative example embodiment of the improved animal feeder showing the feed restrictor.
Figure 19:
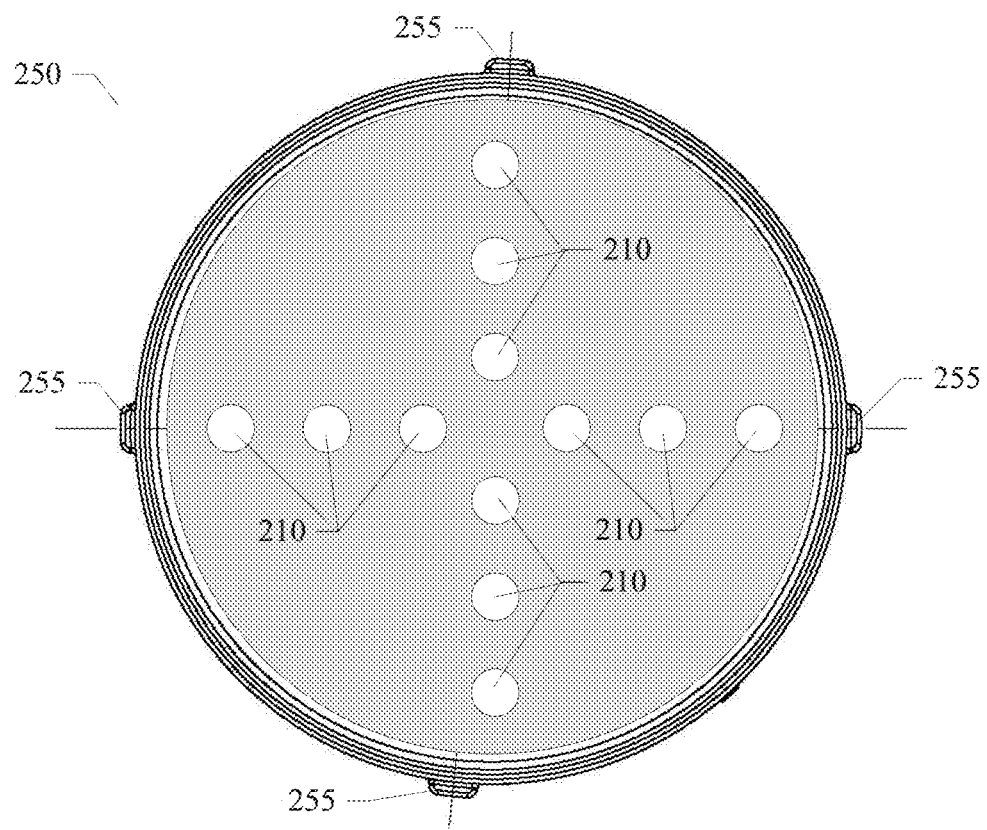
FIG. 19 illustrates a top view of the feed restrictor of an alternative example embodiment of the improved animal feeder.
Figure 20:
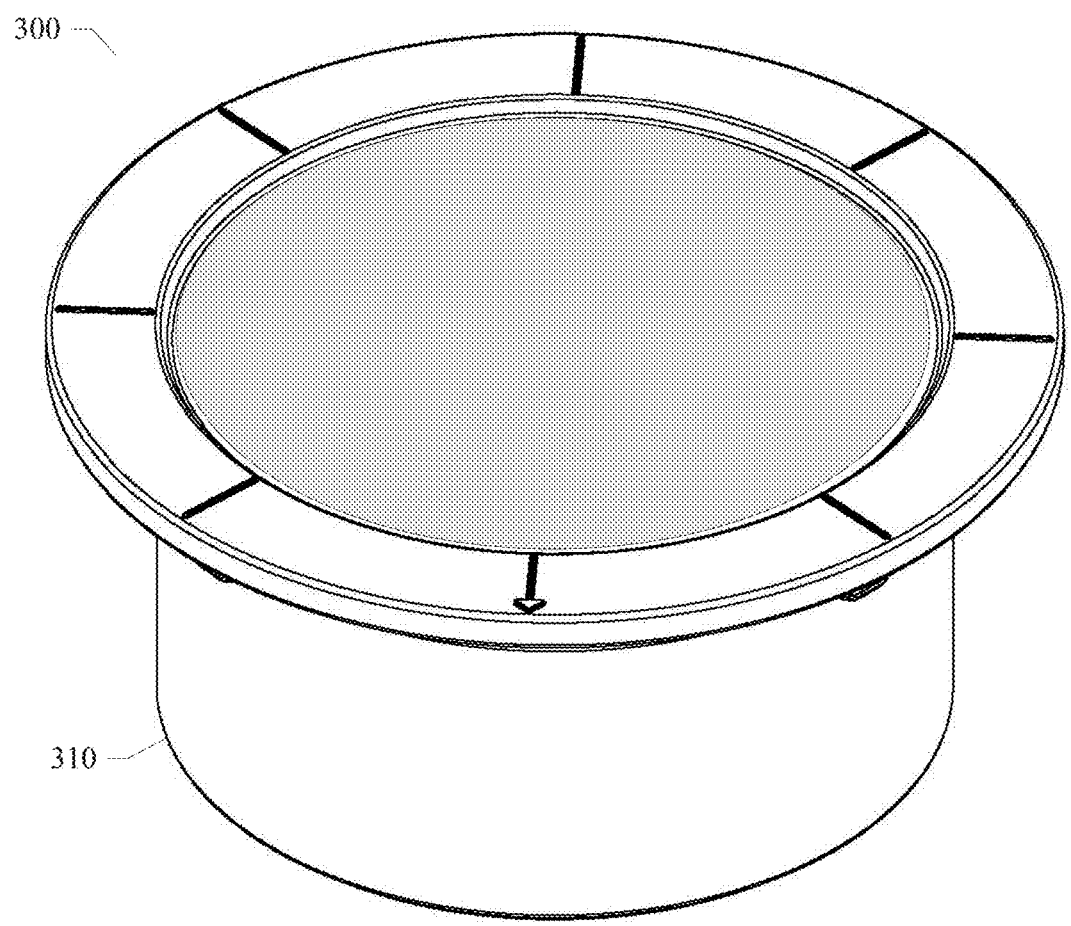
FIG. 20 illustrates an isometric view of an alternative example embodiment of the improved animal feeder showing the barrel lid for insertion onto the top of the barrel.
Figure 21:
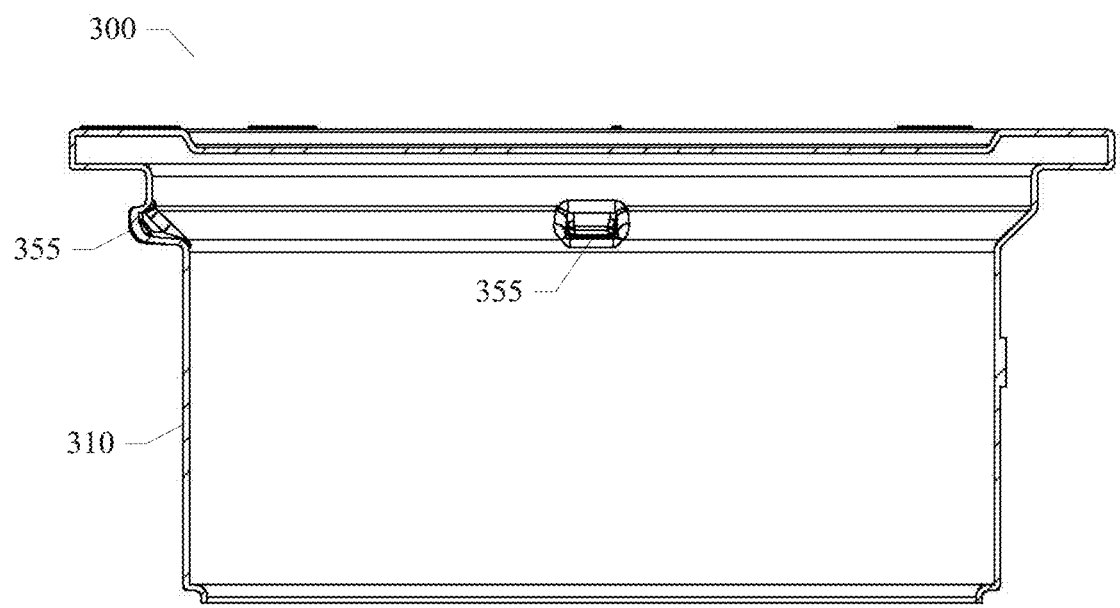
FIG. 21 illustrates a side view of the barrel lid of an alternative example embodiment of the improved animal feeder.
Figure 22:
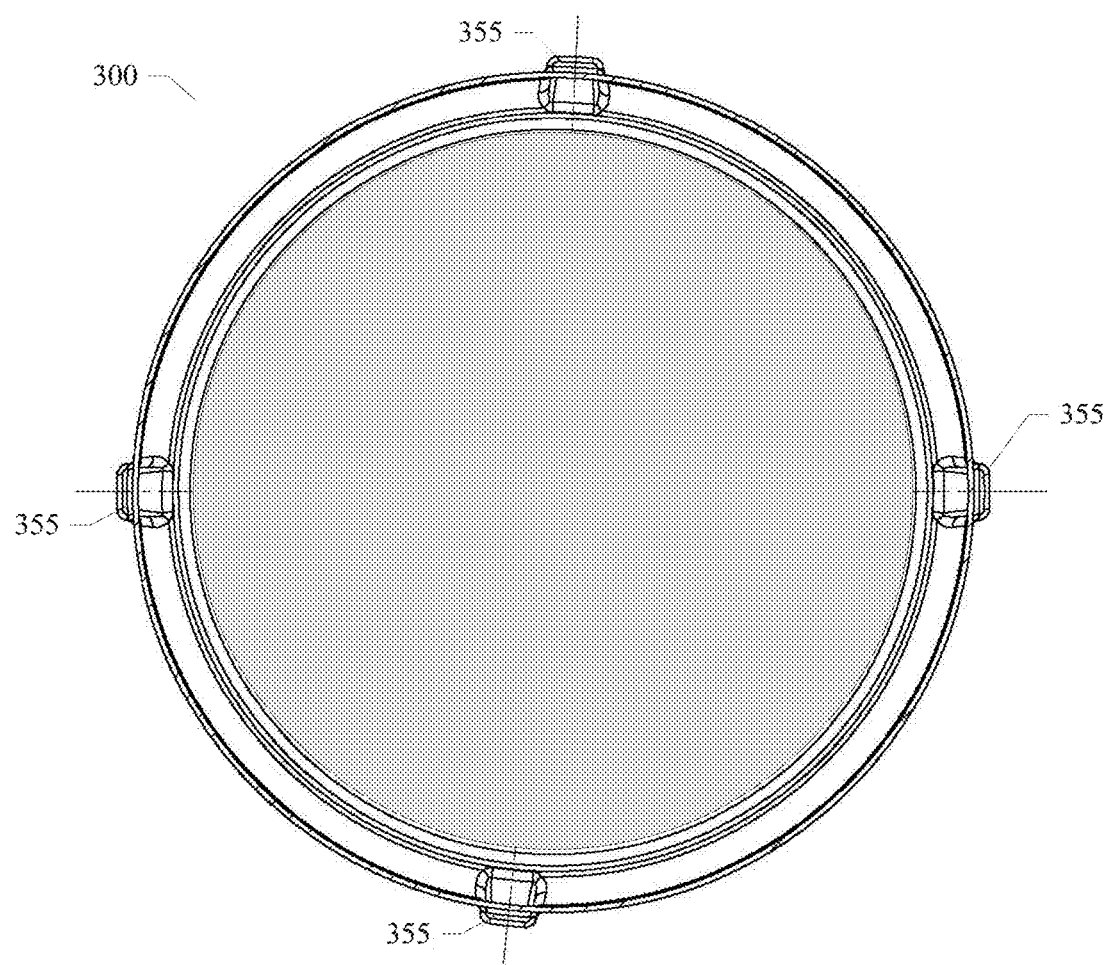
FIG. 22 illustrates a top view of the barrel lid of an alternative example embodiment of the improved animal feeder.

FIG. 15 illustrates an isometric view of an alternative example embodiment of the improved animal feeder showing the barrel 150 without the feed restrictor 250 inserted therein. In this alternative example embodiment, the barrel 150 has been fitted with a slotted lip 154 at the top end of the barrel 150 as shown in FIG. 15. The slotted lip 154 includes a plurality of notches 155 positioned to align with corresponding nubs protruding outwardly from the outside round surface of the feed restrictor 250 as shown in FIGS. 18 and 19 and described in more detail below. Similarly, the plurality of notches 155 of slotted lip 154 are also positioned to align with corresponding nubs protruding from the outside round surface of the barrel lid 300 as shown in FIGS. 20 through 22 and described in more detail below.

The plurality of notches 155 and the slotted lip 154 of barrel 150 can be used with nubs 255 of the feed restrictor 250 and nubs 355 of the barrel lid 300 for locking in either or both the feed restrictor 250 and/or the barrel lid 300 into or onto the barrel 150. The feed restrictor 250 can be locked into the barrel 150 by turning the feed restrictor 250 laterally, as indicated by the arrows 156 shown in FIG. 16, until the nubs 255 of the feed restrictor 250 are aligned with the plurality of notches 155 in the slotted lip 154 of barrel 150. When this alignment is achieved, the feed restrictor 250 can be inserted or dropped into the internal cavity of barrel 150 and brought to rest on top of the feed material inside of the barrel 150. The feed restrictor 250 can then be turned laterally to mis-align the plurality of notches 155 in the slotted lip 154 of barrel 150 relative to the nubs 255 of the feed restrictor 250. When this mis-alignment is achieved, the feed restrictor 250 will be locked into the barrel 150. The feed restrictor 250 can be removed from the barrel 150 by turning the feed restrictor 250 laterally, as indicated by the arrows 156 shown in FIG. 16, until the nubs 255 of the feed restrictor 250 are aligned with the plurality of notches 155 in the slotted lip 154 of barrel 150. When this alignment is achieved, the feed restrictor 250 can be removed from the barrel 150.

As described above, the feed restrictor 250 can include feed access holes 210, which allow an animal to get access to the animal feed in a restricted manner. The feed restrictor 250 can float down into the barrel 150 and can spin laterally as the feed is consumed. The slotted lip 154 of barrel 150 prevents the feed restrictor 250 from exiting the top of the barrel 150 and thereby locks the feed restrictor 250 into the barrel 150 as long as the nubs 255 of the feed restrictor 250 are not aligned with the plurality of notches 155 in the slotted lip 154 of barrel 150.

Figure 16:
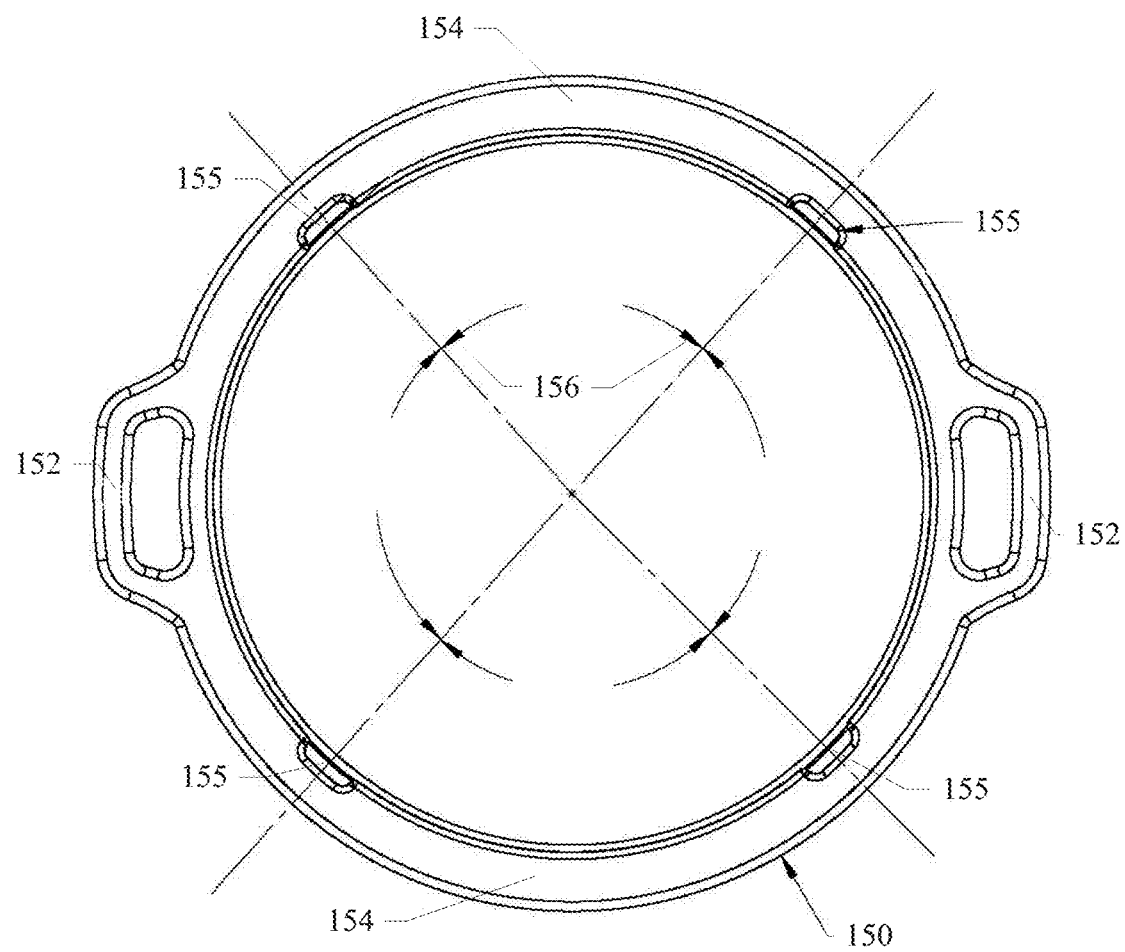
FIG. 16 illustrates a top view of the barrel of an alternative example embodiment of the improved animal feeder.
Figure 17:
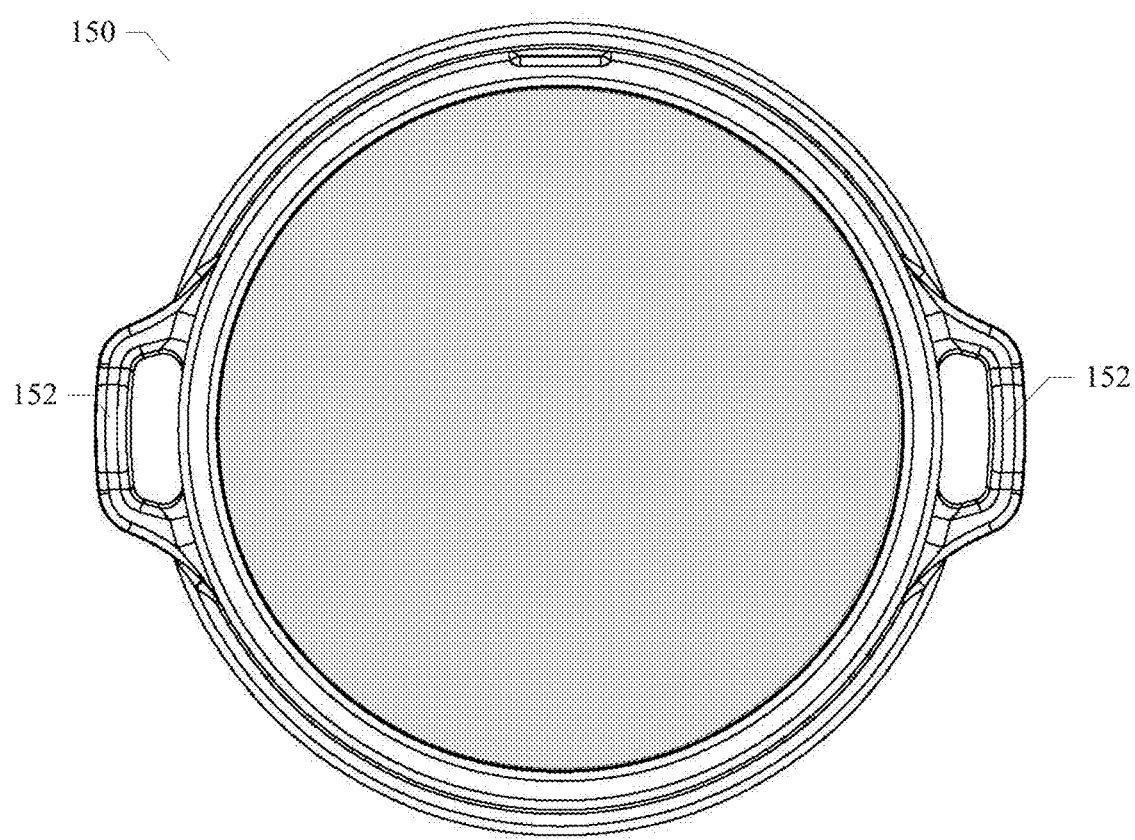
FIG. 17 illustrates a bottom view of the barrel of an alternative example embodiment of the improved animal feeder.

In an alternative embodiment as shown in FIGS. 15 through 17, the barrel 150 can be molded as a single unit, which is closed at one end. FIG. 15 illustrates an isometric view of the barrel 150 without the feed restrictor 250 inserted therein. FIG. 16 illustrates a top view of the barrel 150 of an alternative example embodiment. FIG. 17 illustrates a bottom view of the barrel 150 of an alternative example embodiment. At the top of the barrel 150, handles 152 can be molded or integrated into the barrel 150 for easy movement of the animal feeder. Except for the open top, the barrel 150 provides a water-tight enclosure for the animal feed deposited therein. Near the lower end of barrel 150, a pluggable drain hole 130 is provided in the side wall of the barrel 150 to enable removal of any accumulated liquid at the bottom of barrel 150.

FIGS. 18 and 19 illustrate the feed restrictor 250 of an alternative example embodiment. FIG. 18 illustrates an isometric view of an alternative example embodiment of the feed restrictor 250. FIG. 19 illustrates a top view of the feed restrictor 250 of an alternative example embodiment. As shown, the feed restrictor 250 includes a plurality of nubs 255 arranged around an outside round surface of the feed restrictor 250 as shown in FIGS. 18 and 19. The plurality of nubs 255 of feed restrictor 250 are positioned to align with a corresponding plurality of notches 155 of slotted lip 154 of barrel 150. As described above, the plurality of notches 155 and the slotted lip 154 of barrel 150 can be used with nubs 255 of the feed restrictor 250 for locking the feed restrictor 250 into the barrel 150. As shown in FIG. 19 and described in more detail above, the feed restrictor 250 can include feed access holes 210 that allow an animal to access the animal feed deposited in barrel 150 in a restricted manner.

FIGS. 20 through 22 illustrate the barrel lid 300 of an alternative example embodiment. FIG. 20 illustrates an isometric view of an alternative example embodiment of the barrel lid 300 for insertion onto the top of the barrel 150. FIG. 21 illustrates a side view of the barrel lid 300 of an alternative example embodiment. FIG. 22 illustrates a top view of the barrel lid 300 of an alternative example embodiment of the improved animal feeder. As shown, the barrel lid 300 includes a plurality of nubs 355 arranged around an outside round surface of the barrel lid 300 as shown in FIGS. 21 and 22. The plurality of nubs 355 of barrel lid 300 are positioned to align with a corresponding plurality of notches 155 of slotted lip 154 of barrel 150. The plurality of notches 155 and the slotted lip 154 of barrel 150 can be used with nubs 355 of the barrel lid 300 for locking the barrel lid 300 onto the barrel 150. The barrel lid 300 can be locked onto the barrel 150 by turning the barrel lid 300 laterally, as indicated by the arrows 156 shown in FIG. 16, until the nubs 355 of the barrel lid 300 are aligned with the plurality of notches 155 in the slotted lip 154 of barrel 150. When this alignment is achieved, the barrel lid 300 can be inserted or placed onto the top opening of barrel 150. The barrel lid 300 can then be turned laterally to mis-align the plurality of notches 155 in the slotted lip 154 of barrel 150 relative to the nubs 355 of the barrel lid 300. When this mis-alignment is achieved, the barrel lid 300 will be locked onto the top of the barrel 150. The barrel lid 300 can be removed from the top of the barrel 150 by turning the barrel lid 300 laterally, as indicated by the arrows 156 shown in FIG. 16, until the nubs 355 of the barrel lid 300 are aligned with the plurality of notches 155 in the slotted lip 154 of barrel 150. When this alignment is achieved, the barrel lid 300 can be removed from the top opening of barrel 150.

In an alternative embodiment, the barrel lid 300 can include an extended lower portion 310 that fits into the internal cavity of the barrel 150 when the barrel lid 300 is locked onto the barrel 150. When the barrel lid 300 is removed from the barrel 150, the barrel lid 300 can be flipped over and the extended lower portion 310 of the barrel lid 300 can provide a water container, which can be filled with water and from which animals can drink.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an improved animal feeder with an insertable feed restrictor is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

I claim:

1. An animal feeder comprising:
a barrel into which animal feed may be deposited, the barrel including a first locking mechanism; and
a feed restrictor configured for removable insertion into an opening of the barrel, the feed restrictor having an upper surface and a side surface, the feed restrictor including a second locking mechanism, the side surface being configured to slide adjacent to an inner surface of the barrel, the feed restrictor including a plurality of feed access holes arranged on the upper surface, the feed restrictor being configured to float on top of the animal feed deposited in the barrel, the feed restrictor being further configured to freely slide longitudinally in the barrel, the feed restrictor being further configured to lock into the barrel when the second locking mechanism is not properly configured relative to the first locking mechanism.

2. The animal feeder of claim 1 wherein the barrel and the feed restrictor are fabricated from a material from the group: polyethylene and a plastic blend material.

3. The animal feeder of claim 1 wherein the barrel includes a drain hole.

4. The animal feeder of claim 1 wherein the first locking mechanism is a slotted lip on the barrel that prevents removal of the feed restrictor from an interior of the barrel, unless the second locking mechanism of the feed restrictor is properly aligned with the slotted lip of the barrel.

5. The animal feeder of claim 1 wherein the plurality of feed access holes being arranged in size and number for animals feeding on a type of feed from the group: hay, alfalfa, and long stem grasses.

6. The animal feeder of claim 1 wherein the plurality of feed access holes being arranged in size and number for animals feeding on food pellets.

7. The animal feeder of claim 1 wherein the plurality of feed access holes being arranged in size with a diameter hole size determined according to the type of feed being used.

8. The animal feeder of claim 1 including a barrel lid configured for removable insertion onto the opening of the barrel.

9. The animal feeder of claim 8 wherein the barrel lid being further configured to lock into the barrel when a plurality of nubs on the barrel lid are mis-aligned with the first locking mechanism of the barrel.

10. The animal feeder of claim 8 wherein an extended lower portion of the barrel lid being further configured to provide a water container.

11. An apparatus comprising:
a feed container means into which animal feed may be deposited, the feed container means including a first locking mechanism; and
a feed restricting means configured for removable insertion into an opening of the feed container means, the feed restricting means having an upper surface and a side surface, the feed restricting means including a second locking mechanism, the side surface being configured to slide adjacent to an inner surface of the feed container means, the feed restricting means including a plurality of feed access holes arranged on the upper surface, the feed restricting means being configured to float on top of the animal feed deposited in the feed container means, the feed restricting means being further configured to freely slide longitudinally in the feed container means, the feed restricting means being further configured to lock into the feed container means when the second locking mechanism is not properly configured relative to the first locking mechanism.

12. The apparatus of claim 11 wherein the feed container means and the feed restricting means are fabricated from a material from the group: polyethylene and a plastic blend material.

13. The apparatus of claim 11 wherein the feed container means includes a drain hole.

14. The apparatus of claim 11 wherein the first locking mechanism is a slotted lip on the feed container means that prevents removal of the feed restricting means from an interior of the feed container means, unless the second locking mechanism of the feed restricting means is properly aligned with the slotted lip of the feed container means.

15. The apparatus of claim 11 wherein the plurality of feed access holes being arranged in size and number for animals feeding on a type of feed from the group: hay, alfalfa, and long stem grasses.

16. The apparatus of claim 11 wherein the plurality of feed access holes being arranged in size and number for animals feeding on food pellets.

17. The apparatus of claim 11 wherein the plurality of feed access holes being arranged in size with a diameter hole size determined according to the type of feed being used.

18. The apparatus of claim 11 including a barrel lid means configured for removable insertion onto the opening of the feed container means.

19. The apparatus of claim 18 wherein the barrel lid means being further configured to lock into the feed container means when a plurality of nubs on the barrel lid means are mis-aligned with the first locking mechanism of the feed container means.

20. The apparatus of claim 18 wherein an extended lower portion of the barrel lid means being further configured to provide a water container.

\* \* \* \* \*